(12) United States Patent
Pess et al.

(10) Patent No.: US 11,745,140 B2
(45) Date of Patent: Sep. 5, 2023

(54) WATER SYSTEMS FOR ONBOARD INERTING SYSTEMS OF VEHICLES

(71) Applicant: Hamilton Sundstrand Corporation, Charlotte, NC (US)

(72) Inventors: Matthew Pess, West Hartford, CT (US); Peter A T Cocks, South Glastonbury, CT (US); Kevin P. Aceves, Weatogue, CT (US); Michael L. Perry, Glastonbury, CT (US); Jonathan Rheaume, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1038 days.

(21) Appl. No.: 16/374,976

(22) Filed: Apr. 4, 2019

(65) Prior Publication Data
US 2020/0316520 A1    Oct. 8, 2020

(51) Int. Cl.
*B01D 53/32* (2006.01)
*B64D 37/32* (2006.01)
*C02F 1/00* (2023.01)
*C02F 9/00* (2023.01)
*C02F 1/04* (2023.01)
(Continued)

(52) U.S. Cl.
CPC ........... *B01D 53/326* (2013.01); *B64D 37/32* (2013.01); *C02F 1/008* (2013.01); *C02F 9/00* (2013.01); *C02F 1/001* (2013.01); *C02F 1/04* (2013.01); *C02F 1/325* (2013.01); *C02F 1/42* (2013.01); *C02F 1/441* (2013.01); *C02F 2201/001* (2013.01)

(58) Field of Classification Search
CPC .................................................. B01D 53/326
See application file for complete search history.

(56) References Cited

U.S. PATENT DOCUMENTS 6,179,986 B1  1/2001  Swette et al.
7,629,068 B2 12/2009  Hoffjann et al.
(Continued)

FOREIGN PATENT DOCUMENTS

DE  102010018273 A1  10/2011
EP        1817231 A2   8/2007
(Continued)

OTHER PUBLICATIONS

Amoroso V et al.; "High-Rise Deionized Water Systems"; Heating, Piping and Air Conditioning; Reinhold Publishing Co. Inc.; vol. 61; No. 1; Jan. 1, 1989; pp. 127-132.
(Continued)

*Primary Examiner* — Richard C Gurtowski
(74) *Attorney, Agent, or Firm* — Cantor Colburn LLP

(57) ABSTRACT

Systems and methods for generating inerting gas on vehicles are described. The systems include a proton exchange membrane (PEM) inerting system, a pure water replenishment system configured to provide pure water to the PEM inerting system, wherein the pure water replenishment system is in fluid communication with the PEM inerting system to replenish water lost during operation of the PEM inerting system, and a control system configured to control operation of the pure water replenishment system to automatically replenish pure water to the PEM inerting system.

19 Claims, 9 Drawing Sheets

(51) Int. Cl.
*C02F 1/32* (2023.01)
*C02F 1/42* (2023.01)
*C02F 1/44* (2023.01)

(56) References Cited

U.S. PATENT DOCUMENTS

| | | | |
|---|---|---|---|
| 8,021,525 | B2 | 9/2011 | Giddey et al. |
| 9,963,792 | B2 | 5/2018 | Rheaume |
| 10,179,309 | B2 | 1/2019 | Rheaume et al. |
| 10,532,311 | B2 | 1/2020 | Rheaume et al. |
| 2004/0038089 | A1 | 2/2004 | Hoffjan et al. |
| 2004/0188352 | A1 | 9/2004 | Dey et al. |
| 2007/0111060 | A1 | 5/2007 | Hoffjann et al. |
| 2008/0001026 | A1 | 1/2008 | Hoffjann et al. |
| 2012/0251909 | A1* | 10/2012 | Narasimhamurthy ............... H01M 8/04291 429/429 |
| 2015/0166375 | A1 | 6/2015 | Freydina et al. |
| 2016/0030781 | A1* | 2/2016 | Hoffjann .............. B01J 19/0006 422/162 |
| 2017/0141417 | A1 | 5/2017 | Lucas et al. |
| 2017/0167037 | A1 | 6/2017 | Rheaume |
| 2017/0341019 | A1 | 11/2017 | Rheaume et al. |
| 2019/0001264 | A1 | 1/2019 | Rheaume et al. |
| 2019/0127253 | A1* | 5/2019 | Thomas .................... E03B 3/28 |

FOREIGN PATENT DOCUMENTS

| | | |
|---|---|---|
| EP | 2824744 A1 | 1/2015 |
| EP | 3181457 A1 | 6/2017 |
| EP | 3243551 A1 | 11/2017 |
| EP | 3284676 A1 | 2/2018 |
| EP | 3421374 A1 | 1/2019 |
| FR | 2949479 A1 | 3/2011 |
| KR | 101859135 B1 | 5/2018 |
| RO | 114439 B1 | 4/1999 |
| WO | 2009073175 A2 | 6/2009 |
| WO | 2013140312 A2 | 9/2013 |

OTHER PUBLICATIONS

European Search Report for European Application No. 19211109.4, International Filing Date Nov. 25, 2019, dated Jul. 27, 2020, 13 pages.

* cited by examiner

WATER SYSTEMS FOR ONBOARD INERTING SYSTEMS OF VEHICLES

BACKGROUND

The subject matter disclosed herein generally relates to systems for generating and providing inert gas on vehicles (e.g., aircraft, military vehicles, heavy machinery vehicles, sea craft, ships, submarines, etc.), and, more particularly, to water systems for such inert gas generating systems.

It is recognized that fuel vapors within fuel tanks become combustible or explosive in the presence of oxygen. An inerting system decreases the probability of combustion or explosion of flammable materials in a fuel tank by maintaining a chemically non-reactive or inerting gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inerting gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip vehicles (e.g., aircraft, military vehicles, heavy machinery vehicles, sea craft, ships, submarines, etc.) with onboard inerting gas generating systems, which supply nitrogen-enriched air to the vapor space (i.e., ullage) within the fuel tank. The nitrogen-enriched air has a substantially reduced oxygen content that reduces or eliminates oxidizing conditions within the fuel tank. Onboard inerting gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and nitrogen-enriched air (NEA) on the high-pressure side of the membrane. The requirement for a pressure differential necessitates a source of compressed or pressurized air.

One type of membrane-based gas separator is a Proton Exchange Membrane (PEM). The PEM is an electrolytic gas generator that requires deionized (DI) water to operate. In theory, the water consumed at the anodes is balanced by water generated at the cathodes, however, some water exits the cathodes with the flow of inert gas. It is not economically possible to recover all of the water from the inert gas, so over time the PEM system loses water. This must be replenished for proper device operation.

BRIEF DESCRIPTION

According to some embodiments, systems for generating inerting gas on vehicles are provided. The systems include a proton exchange membrane (PEM) inerting system, a pure water replenishment system configured to provide pure water to the PEM inerting system, wherein the pure water replenishment system is in fluid communication with the PEM inerting system to replenish water lost during operation of the PEM inerting system, and a control system configured to control operation of the pure water replenishment system to automatically replenish pure water to the PEM inerting system.

In addition to one or more of the features described herein, or as an alternative, further embodiments of the systems may include that the control system comprises a controller configured to electronically control operation of the pure water replenishment system.

In addition to one or more of the features described herein, or as an alternative, further embodiments of the systems may include that the control system comprises a mechanical actuator configured to passively control operation of the pure water replenishment system.

In addition to one or more of the features described herein, or as an alternative, further embodiments of the systems may include that the mechanical actuator is a float valve.

In addition to one or more of the features described herein, or as an alternative, further embodiments of the systems may include that the pure water replenishment system comprises a container filled with pure water.

In addition to one or more of the features described herein, or as an alternative, further embodiments of the systems may include that the pure water replenishment system comprises a water purification system to treat water and generate pure water to be supplied to the PEM inerting system.

In addition to one or more of the features described herein, or as an alternative, further embodiments of the systems may include that the water purification system receives water from a vehicle water tank.

In addition to one or more of the features described herein, or as an alternative, further embodiments of the systems may include that the water purification system includes at least one of a particulate filter, a heat source, and a condenser.

In addition to one or more of the features described herein, or as an alternative, further embodiments of the systems may include a reservoir tank to receive pure water from the water purification system.

In addition to one or more of the features described herein, or as an alternative, further embodiments of the systems may include at least one treatment component configured to pre-treat the water prior to entering the water purification system.

In addition to one or more of the features described herein, or as an alternative, further embodiments of the systems may include that the at least one treatment component comprises an ultraviolet light source.

In addition to one or more of the features described herein, or as an alternative, further embodiments of the systems may include that the water purification system includes at least one of a particulate filter and an ion exchange module.

In addition to one or more of the features described herein, or as an alternative, further embodiments of the systems may include that the water purification system includes at least one of an organic filter and a reverse osmosis module.

In addition to one or more of the features described herein, or as an alternative, further embodiments of the systems may include that a portion of water treated within the water purification system is supplied to a domestic water supply of the vehicle.

In addition to one or more of the features described herein, or as an alternative, further embodiments of the systems may include a pump configured to supply water to the water purification system.

In addition to one or more of the features described herein, or as an alternative, further embodiments of the systems may include that the PEM inerting system generates an inert gas for use on the vehicle.

In addition to one or more of the features described herein, or as an alternative, further embodiments of the systems may include that the inert gas is provided to at least one of a vehicle fuel tank ullage space, a vehicle cargo hold, a vehicle fire suppression system, and a vehicle equipment bay.

In addition to one or more of the features described herein, or as an alternative, further embodiments of the systems may include a recapture loop configured to direct at least one of moisture and water from an output of the PEM inerting system back into the PEM inerting system.

In addition to one or more of the features described herein, or as an alternative, further embodiments of the systems may include that the recapture loop includes a water treatment system.

In addition to one or more of the features described herein, or as an alternative, further embodiments of the systems may include at least one sensor configured to monitor at least one of a fluid level, a fluid flow rate, and a valve position of the pure water replenishment system.

According to some embodiments, methods for generating inerting gas on a vehicle are provided. The methods include generating an inerting gas using a proton exchange membrane (PEM) inerting system, providing pure water to the PEM inerting system from a pure water replenishment system, wherein the pure water replenishment system is in fluid communication with the PEM inerting system to replenish water lost during operation of the PEM inerting system, and controlling operation of the pure water replenishment system to automatically replenish pure water to the PEM inerting system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings in which like elements are numbered alike.

DETAILED DESCRIPTION

A detailed description of one or more embodiments of the disclosed apparatuses and methods are presented herein by way of illustration and exemplification and without limitation with reference to the Figures.

Figure 1A:
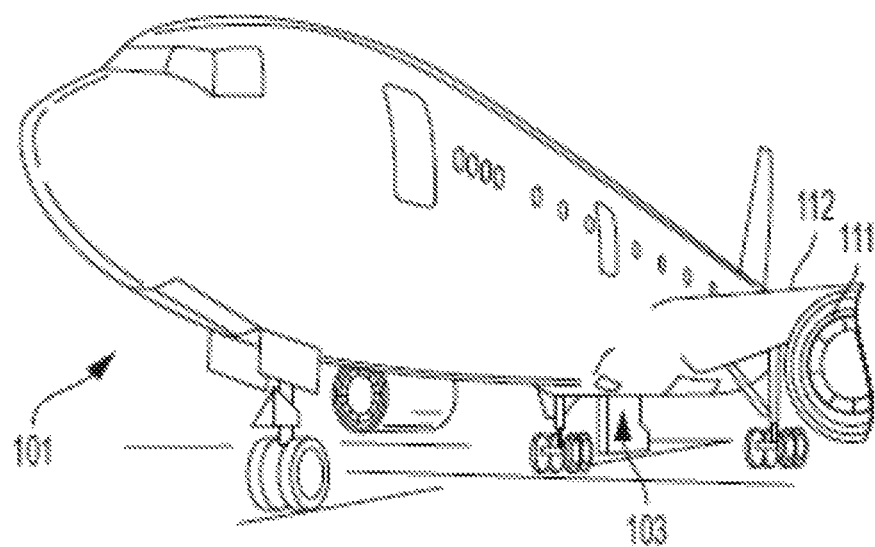
FIG. 1A is a schematic illustration of an aircraft that can incorporate various embodiments of the present disclosure.
Figure 1B:
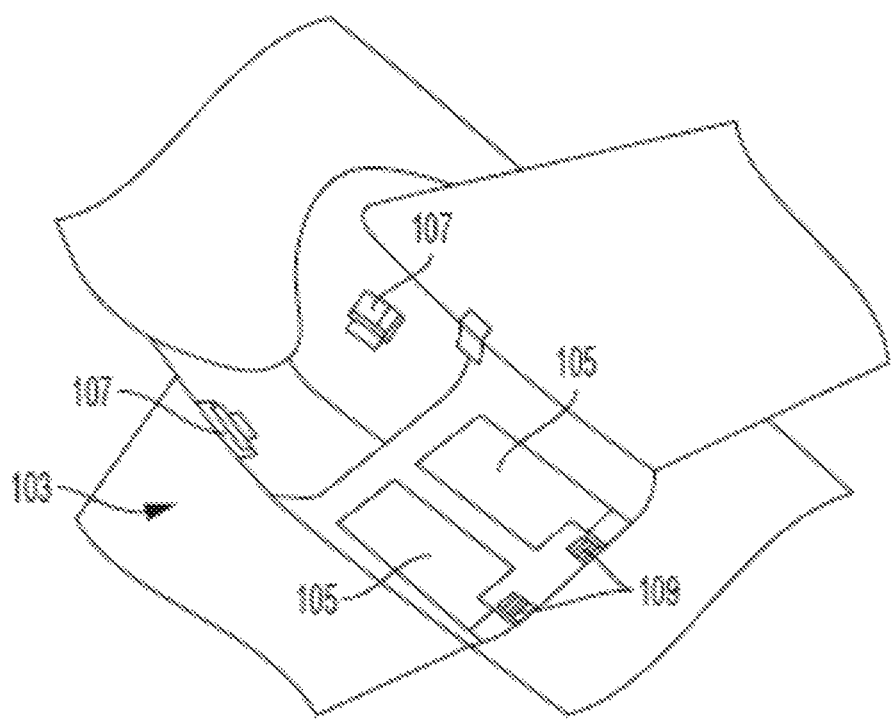
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems and/or fuel inerting systems within the bay 103. As shown in FIG. 1B, the bay 103 includes bay doors 105 that enable installation and access to one or more components (e.g., environmental control systems, fuel inerting systems, etc.) installed within or on the aircraft. During operation of environmental control systems and/or fuel inerting systems of the aircraft, air that is external to the aircraft can flow into one or more ram air inlets 107. The outside air (i.e., ram air) may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings. The engines and/or fuel tanks may be located at other locations depending on the specific aircraft configuration. In some aircraft configurations, air can be bled from the engines 111 and supplied to environmental control systems and/or fuel inerting systems, as will be appreciated by those of skill in the art.

Although shown and described above and below with respect to an aircraft, embodiments of the present disclosure are applicable to any type of vehicle. For example, aircraft, military vehicles, heavy machinery vehicles, sea craft, ships, submarines, etc., may benefit from implementation of embodiments of the present disclosure. For example, aircraft and other vehicles having fire suppression systems, emergency power systems, and other systems that may electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 2:
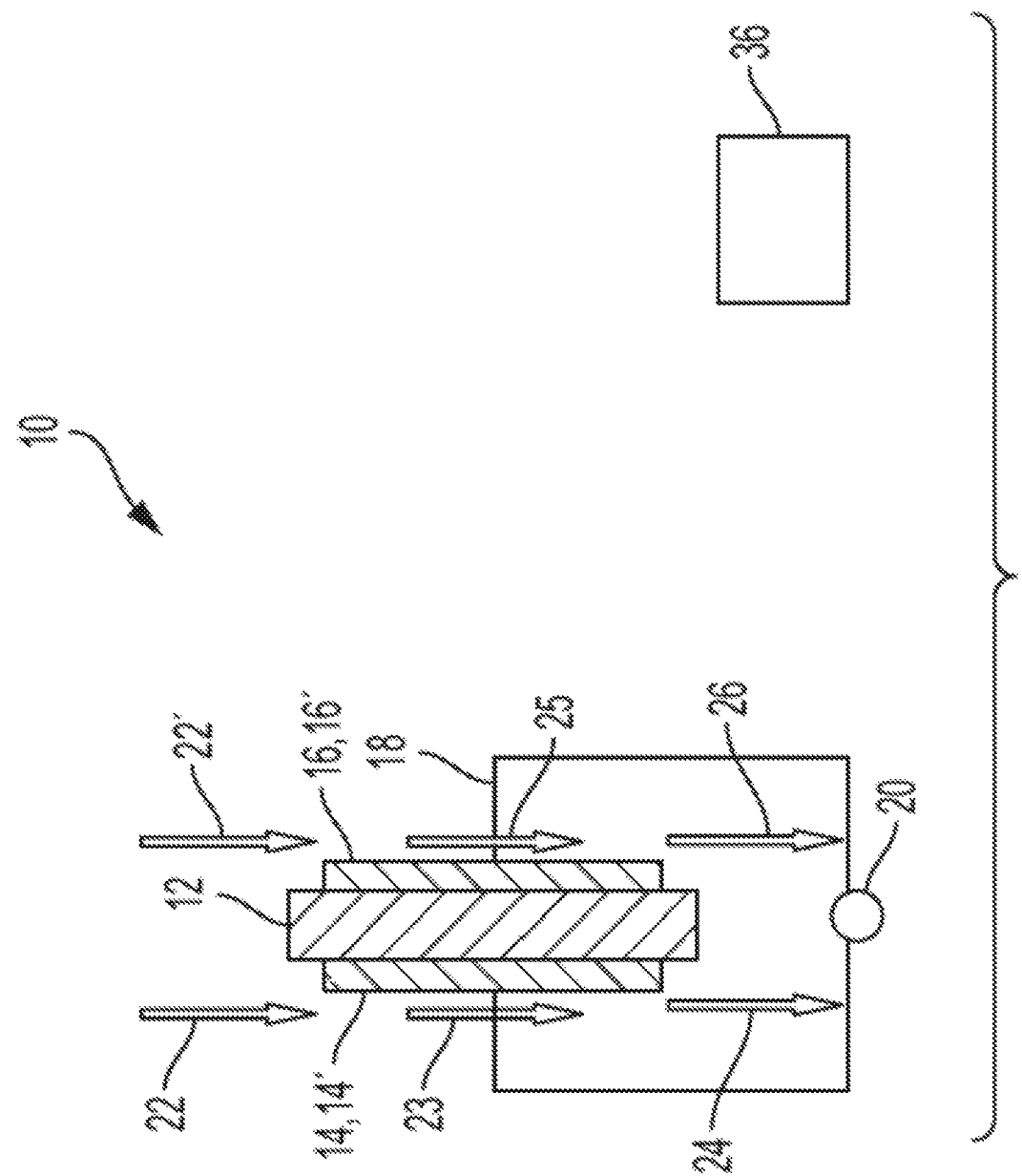
FIG. 2 is a schematic depiction an example embodiment of an electrochemical cell.

Referring now to FIG. 2, an electrochemical cell 10 is schematically depicted. The electrochemical cell 10 comprises a separator 12 that includes an ion transfer medium. As shown in FIG. 2, the separator 12 has a cathode 14 disposed on one side and an anode 16 disposed on the other side. The cathode 14 and the anode 16 can be fabricated from catalytic materials suitable for performing a desired electrochemical reaction (e.g., an oxygen-reduction reaction at the cathode and an oxidation reaction at the anode). Catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Some organic materials and metal oxides can also be used as catalysts, as contrasted to electrochemical cells utilizing proton exchange membranes where the conditions preclude the use of metal oxide catalysts. Examples of metal oxide catalysts include, but are not limited to ruthenium oxides, iridium oxides or transition-metal oxides, generically depicted as $M_xO_y$, where x and y are positive numbers capable of forming a stable catalytic metal oxide such as $Co_3O_4$.

The cathode 14 and the anode 16, each including a respective catalyst 14',16', are positioned adjacent to, and preferably in contact with, the separator 12 and can be porous metal layers deposited (e.g., by vapor deposition) onto the separator 12. In other embodiments, the cathode 14 and the anode 16 can each have structures comprising discrete catalytic particles adsorbed onto a porous substrate that is attached to the separator 12. Alternatively, catalyst particles can be deposited on high surface area powder materials (e.g., graphite, porous carbons, metal-oxide particles, etc.) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, layers of the cathode 14 and layers of the anode 16 may include a binder material, such as a polymer, especially one that also acts as an ionic conductor such as anion-conducting ionomers. In some embodiments, the layers of the cathode 14 and layers of the anode 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and the anode 16 can be controllably and/or electrically connected by an electrical circuit 18 to a controllable electric power system 20. The electric power system can include a power source, such as DC power rectified from AC power produced by a generator powered by a gas turbine engine used for propulsion or by an auxiliary power unit of an aircraft. In some embodiments, the electric power system 20 can optionally include a connection to an electric power sink (e.g., one or more electricity-consuming systems or components onboard the aircraft) with appropriate switching, power conditioning, and/or power bus(es) for such on-board electricity-consuming systems or components, for optional operation in an alternative fuel cell mode. Inerting gas systems with electrochemical cells that can alternatively operate to produce nitrogen-enriched air in a fuel-consuming power production (e.g., fuel cell) mode or a power consumption mode (e.g., electrolyzer cell) are disclosed in U.S. Patent Application Publication No. 2017/0331131 A1, the disclosure of which is incorporated herein by reference in its entirety.

With continued reference to FIG. 2, a cathode supply fluid flow path 22 directs gas from a cathode gas supply source (e.g., a fuel tank ullage space, an aircraft cargo hold, and/or an aircraft equipment bay) into contact with the cathode 14. Oxygen is electrochemically depleted from air along a cathode fluid flow path 23, and is discharged as nitrogen-enriched air (NEA) (i.e., oxygen-depleted air, ODP) to an inerting gas flow path 24 for delivery to an on-board fuel tank (not shown), or to a vehicle fire suppression system associated with an enclosed space (not shown), or controllably to either or both of a vehicle fuel tank or an on-board fire suppression system.

An anode fluid flow path 25 is configured to controllably receive an anode supply fluid from an anode supply fluid flow path 22'. The anode fluid flow path 25 can include water if the electrochemical cell is configured for proton transfer across the separator 12 (e.g., a proton exchange membrane (PEM) electrolyte or phosphoric acid electrolyte). If the electrochemical cell is configured for oxygen anion transfer across the separator 12 (e.g., a solid oxide electrolyte), it can optionally be configured to receive air along the anode fluid flow path 25. Although not stoichiometrically required by the electrochemical reactions of the solid oxide electrochemical cell, airflow to the anode during power-consumption mode can have the technical effects of diluting the potentially hazardous pure heated oxygen at the anode, and providing thermal regulation to the cell. If the system is configured for alternative operation in a fuel cell mode, the anode fluid flow path 25 can be configured to controllably also receive fuel (e.g., hydrogen for a proton-transfer cell, hydrogen or hydrocarbon reformate for a solid oxide cell). An anode exhaust 26 can, depending on the type of cell and the content of the anode exhaust 26, be exhausted or subjected to further processing. Control of fluid flow along these flow paths can be provided through conduits and valves (not shown), which can be controlled by a controller 36.

In some embodiments, the electrochemical cell 10 can operate utilizing the transfer of protons across the separator 12. Exemplary materials from which the electrochemical proton transfer electrolytes can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells.

During operation of a proton transfer electrochemical cell (i.e., Proton Exchange Membrane "PEM") in the electrolyzer mode, water at the anode undergoes an electrolysis reaction according to the formula:

$$H_2O \rightarrow \tfrac{1}{2}O_2 + 2H^+ + 2e^- \tag{1}$$

The electrons produced by this reaction are drawn from the electrical circuit 18 powered by the electric power source 20 connecting the positively charged anode 16 with the cathode 14. The hydrogen ions (i.e., protons) produced by this reaction migrate across the separator 12, where they react at the cathode 14 with oxygen in the cathode flow path 23 to produce water according to the formula:

$$\tfrac{1}{2}O_2 + 2H^+ + 2e^- \rightarrow H_2O \tag{2}$$

Removal of oxygen from the cathode flow path 23 produces nitrogen-enriched air exiting the region of the cathode 14. The oxygen evolved at the anode 16 by the reaction of formula (1) is discharged as oxygen or an oxygen-enriched air stream as the anode exhaust 26.

During operation of a proton transfer electrochemical cell in a fuel cell mode, fuel (e.g., hydrogen) at the anode undergoes an electrochemical oxidation according to the formula:

$$H_2 \rightarrow 2H^+ + 2e^- \tag{3}$$

The electrons produced by this reaction flow through the electrical circuit 18 to provide electric power to an electric power sink (not shown). The hydrogen ions (i.e., protons) produced by this reaction migrate across the separator 12, where they react at the cathode 14 with oxygen in the cathode flow path 23 to produce water according to the formula (2). Removal of oxygen from the cathode flow path 23 produces nitrogen-enriched air exiting the region of the cathode 14, which can be supplied to a fuel tank ullage.

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions described in formulae (1) and (2) are stoichiometrically balanced with respect to water so that there is no net consumption of water, in practice moisture will be removed by the inerting gas flow path 24 (either entrained or evaporated into the nitrogen-enriched air) as it exits from the region of the cathode 14. Accordingly, in some embodiments, water is circulated past or along the anode 16 along an anode fluid flow path (and optionally also past the cathode 14). In some embodiments, water can be provided at the anode from humidity in air along an anode fluid flow path in fluid communication with the anode. In other embodiments, the water produced at the cathode 14 can be captured and recycled to the anode 16 (not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

In some embodiments, a controller 36 can be in operative communication with the electrochemical cell 10 or associated components (e.g., aspects of the membrane gas separator, and any associated valves, pumps, compressors, conduits, or other fluid flow components, and with switches, inverters, regulators, sensors, and other electrical system components, and any other system components to selectively operate the inerting gas system). The control connections can be through wired electrical signal connections (not shown) or through wireless connections, as will be appreciated by those of skill in the art, or combinations thereof. The controller 36 may be configured to monitor and/or control operation of the electrochemical cell 10 to generate and/or supply inert gas to various locations on an aircraft.

Figure 3:
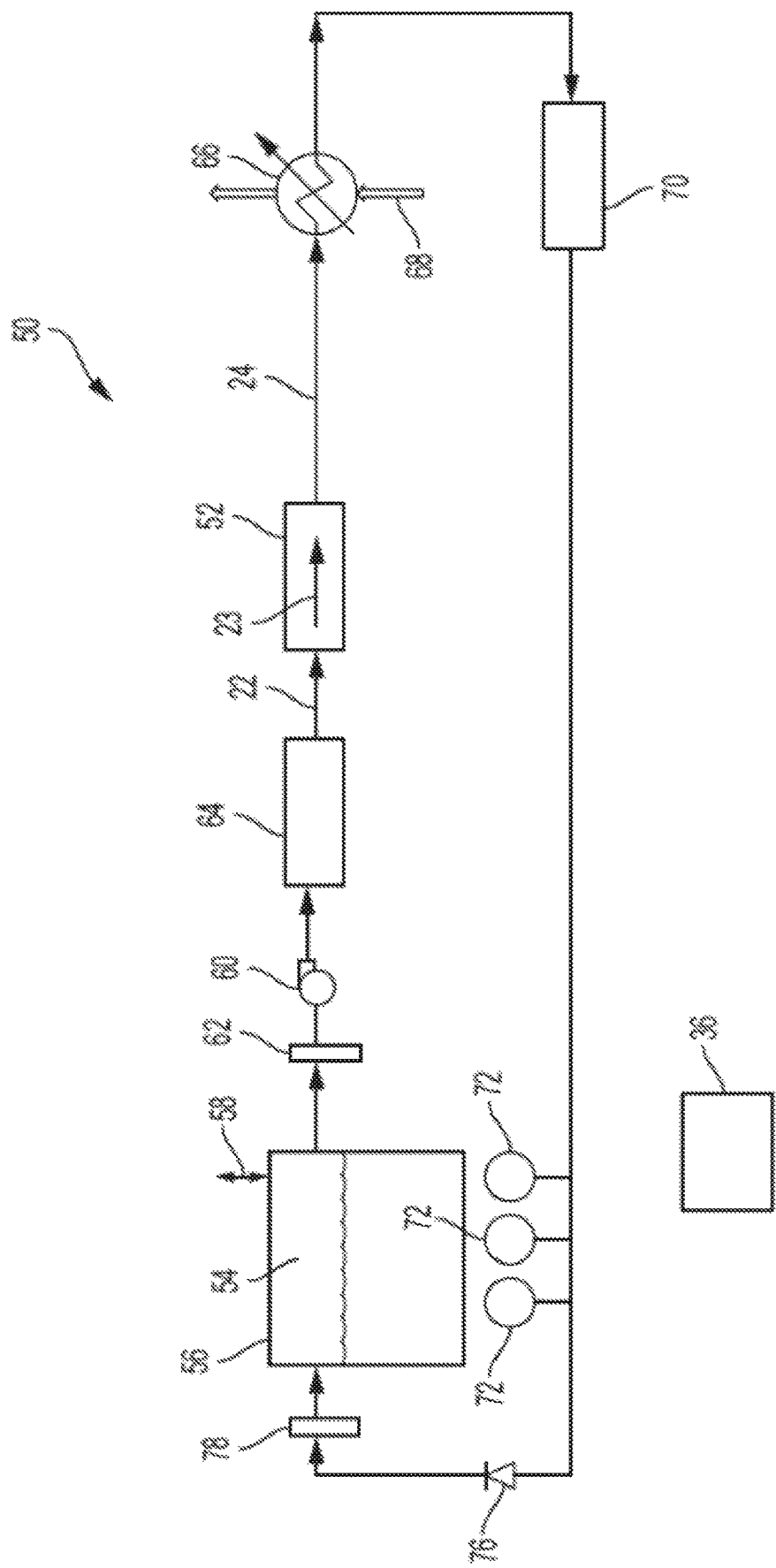
FIG. 3 is a schematic illustration of an example embodiment of an electrochemical inerting system that may incorporate embodiments of the present disclosure.

Turning now to FIG. 3, there is shown an inerting system 50 with an electrochemical cell stack 52 that receives a cathode supply feed 22 from a cathode supply gas source, illustrated as a cathode supply gas source 54, which can include, without limitation, a vehicle fuel tank ullage space, a vehicle cargo hold, and a vehicle equipment bay, and is electrically connected to a power source or sink (not shown). For illustrative purposes, the cathode supply gas source 54 is shown as an ullage space in a fuel tank 56 having a vent 58. However, the cathode supply gas source could also be a cargo hold or an equipment bay, or other location on a vehicle, as will be appreciated by those of skill in the art.

Gas from the cathode supply gas source 54 is directed by a fan or blower 60 through an optional flame arrestor 62 and optional gas treatment module 64 to an internal cathode inlet header (not shown) into one or more cathode fluid flow paths 23 along the cathodes in the electrochemical cell stack 52. For ease of illustration, the anode fluid flow through an anode header of the electrochemical cell stack 52 is not shown in FIG. 3, but can be configured as described above with respect to FIG. 2 (e.g., fuel or water feed connections to an anode side of a PEM electrochemical cell for operation in fuel cell or electrolyzer mode, respectively).

Various types of gas treatment modules 64 can be utilized, either integrated into a single module or as separate modules disposed in series or parallel along the cathode supply fluid flow path 22. In some embodiments, the gas treatment module 64 can be configured to remove fuel vapor from the cathode supply gas, or to remove one or more fuel contaminants from the cathode supply gas, or to remove other contaminants such as smoke such as from a fire in a cargo hold if the cathode supply gas source includes a cargo hold, or any combinations thereof. Examples of gas treatment modules include membrane separators (e.g., a reverse selective membrane with a membrane that has greater solubility with fuel vapor than air) with an optional sweep gas on the side of the membrane opposite the cathode supply fluid flow path, adsorbents (e.g., activated carbon adsorbent as a fuel vapor trap), combustors such as a catalytic oxidation reactor or other combustion reactor, etc. Examples of gas treatments that can remove contaminants include any of the above-mentioned gas treatments for removal of fuel vapor, e.g., adsorbents or catalysts for removal or deactivation of fuel contaminants such as sulfur-containing compounds that could poison catalysts in the electrochemical cell, as well as other treatments such as filters or activated carbon adsorbers.

With continued reference to FIG. 3, oxygen-depleted air is discharged from the cathode side of the electrochemical cells in the electrochemical cell stack 52 along an inerting gas flow path 24 toward one or more cathode supply gas source(s) 54. In some embodiments, a water removal module comprising one or more water removal stations can be disposed between the electrochemical cell stack 52 and the cathode supply gas source(s) 54. Examples of water removal modules include heat exchanger condensers 66 (i.e., a heat exchanger in which removal of heat condenses water vapor to liquid water, which is separated from the gas stream), membrane separators, desiccants, etc. In some embodiments or operating conditions (e.g., on-ground operation), the heat exchanger condenser 66 may not remove all of the desired amount of water to be removed. As such, supplemental drying can optionally be provided. As shown in FIG. 3, the heat exchanger condenser 66 is cooled by ram air 68 to remove water from the inerting gas and an additional dryer 70, such as a membrane separator or desiccant, is configured to remove residual water not removed by the heat exchanger condenser 66.

One or more sensors 72, such as humidity sensors, temperature sensors, and/or oxygen sensors, can be arranged to monitor the quality of the inerting gas. The sensors 72 can be used to provide information and enable control when and under what parameters the inerting gas generation system should be operated. Additional optional features may be included, without departing from the scope of the present disclosure. For example, a check valve 76 and a flame arrestor 78 can be arranged to promote safe and efficient flow of the inerting gas to the cathode supply gas source(s) 54.

Figure 4:
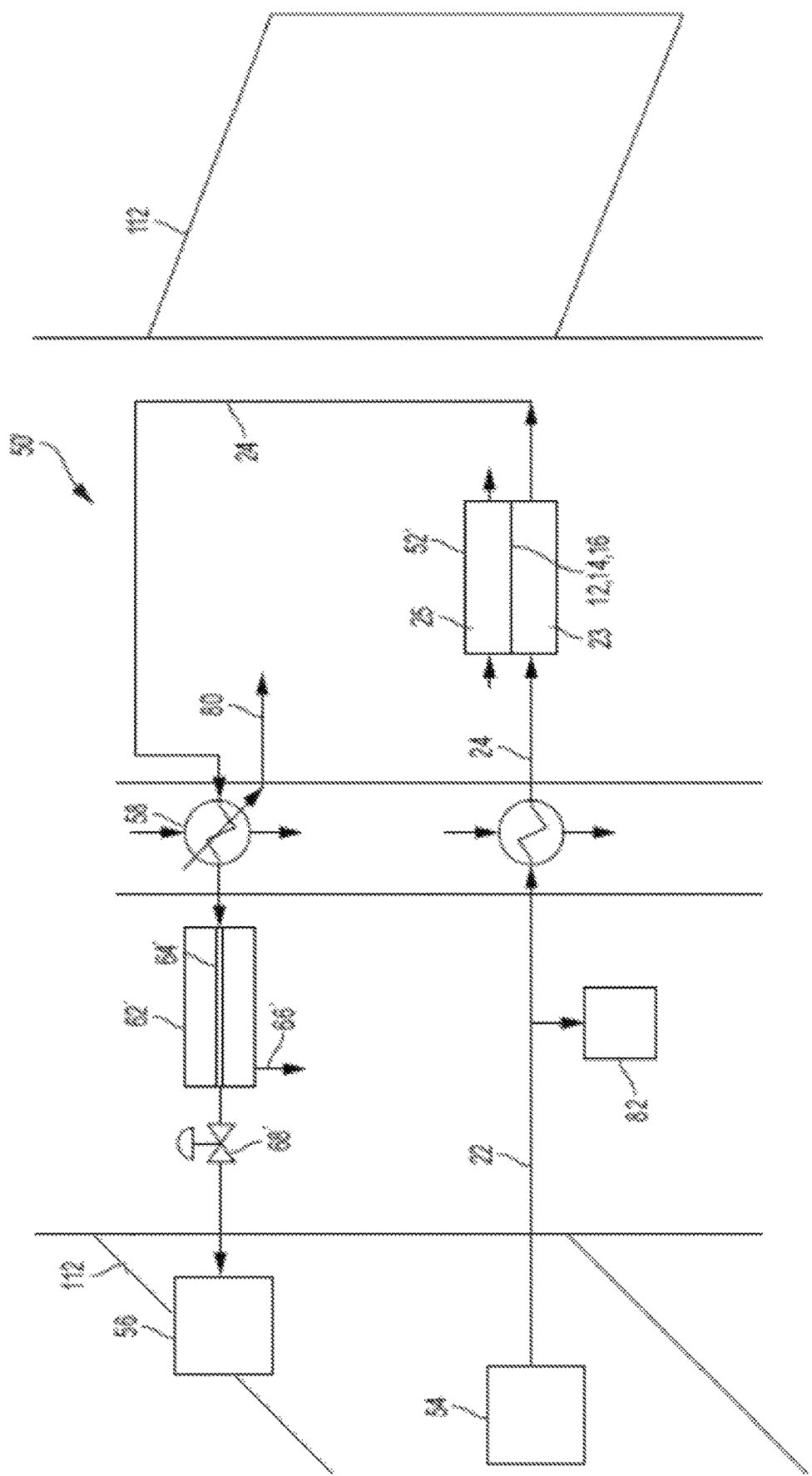
FIG. 4 is a schematic illustration of an example embodiment of an Proton Exchange Membrane (PEM) electrochemical cell inerting system that may incorporate embodiments of the present disclosure.

Turning to FIG. 4, an example embodiment of an inerting system 50' with a PEM electrochemical cell 52' onboard an aircraft is shown. As shown in FIG. 4, air from a compressed air source 54 such as a compressor section of a turbine fan engine is directed along a cathode supply fluid flow path 22 to a PEM electrochemical cell 52'. In some embodiments, some of the compressed air can be diverted to an additional pneumatic load such as an aircraft environmental control system 82. The hot compressed air is then passed through a heat exchanger that receives cooling air from a ram air duct to cool the compressed air to a temperature suitable for the PEM electrochemical cell 52' (e.g., 5-120° C.). As illustratively labeled, the PEM electrochemical cell 52' has a similar structure, components, and labels as that described above, e.g., with respect to FIGS. 2-3.

A proton source is directed to the anode side fluid flow path 25 (e.g., hydrogen gas for operation of the cell in fuel cell (power production) mode, or water for operation of the cell in electrolyzer (power consumption) mode). A condenser receives wet inerting gas from the cathode side fluid flow path 24 and cools it with ram cooling air to condense and remove water 80 from the inerting gas. The inerting gas is optionally then directed to a membrane separator 62' with a water-permeable tubular membrane 64' for removal of additional water 66' and subsequently through a pressure control device 68' to a fuel tank 56 (or other cathode supply gas source such as a cargo hold or equipment bay).

As noted above, PEM electrolytic gas generators require deionized (DI) water to operate. In theory, the water consumed at the anodes is balanced by water generated at the cathodes, however, some water exits the cathodes with the flow of inert gas. However, it is not economically possible to recover all of the water from the inert gas, so over time the PEM system loses water. The water must be replenished for proper device operation.

Existing aircraft water purification systems are configured to disinfect water, but do not remove impurities such as dissolved minerals, salts, and organic compounds. These impurities may result in degradation of performance of the PEM stack if not addressed. As discussed above, a PEM (Proton Exchange Membrane) On Board Inert Gas Generator (OBIGGS) is an electrochemical stack that consumes water, air, and electricity to generate an inert gas stream that can be used for Fuel Tank Inerting and/or Cargo Hold Fire Suppression as described in U.S. Pat. Nos. 9,623,981 and 9,963,792, the contents of which are each incorporated herein in their entireties. The PEM OBIGGS does not require bleed air (e.g., in contrast to conventional Air Separation Modules (ASM) which rely on an air pressure gradient across membranes for separation). In contrast, the PEM OBIGGS electrochemically depletes oxygen from air. In brief, the PEM device electrolyzes water at the anode to generate $O_2$, liberates electrons, and transports protons through a polymer electrolyte. At the cathode, the protons combine with $O_2$ in air to form water vapor. The depletion of $O_2$ thus generates an inert gas consisting of humid nitrogen and any residual oxygen. The amount of oxygen in the inert gas can be tailored to the application (e.g., <12% by volume for fuel tank passivation, <15% for bio-compatible cargo hold fire suppression, etc.). The water vapor in the inert gas stream can be recaptured and recycled, but the water recovery is not perfect and some makeup (e.g., supplementary or replenishment) water is required. As a result, means and methods are needed to provide and supply a PEM inert gas generation system with pure water and/or to maintain a level of pure water (i.e., Deionized (DI) water) to ensure proper operation of a PEM inert gas generation system.

With respect to water purity and "pure water" as used herein, electrical conductivity characterizes water purity. Conductivity relates the ability of a solution to transfer (conduct) electric current. Commonly the unit of measurement is one millionth of a Siemen per centimeter (microSiemens per centimeter or μS/cm). Water going into the PEM stack should have conductivity below 2 μS/cm and preferably below 0.1 μS/cm. In contrast, tap water often has conductivity of 500-800 μS/cm or more and potable water has conductivity in the range of 50 to 1055 μS/cm (1.055 mS/cm). As used herein the term "pure water" means water having a conductivity of 0.055 μS/cm (or less). Distilled water has a conductivity of about 0.5 μS/cm. However, the purity of distilled water will degrade over time upon exposure to atmospheric gases (e.g., carbon dioxide in air dissolves in the distilled water forming an aqueous carbonic acid solution). The acid dissociates into ions which increase conductivity that can reach 10 μS/cm. As such, distilled water is not potable. Reverse Osmosis (R/O) water has a conductivity ranging from 50-100 μS/cm (within potable range).

Deionized (DI) water has a conductivity of about 0.5 μS/cm. Deionized or "demineralized" water has most mineral ions removed and is not potable. Mineral ions include cations such as sodium ($Na^+$), potassium ($K^+$), magnesium ($Mg^{+2}$), iron ($Fe^{+2}$, $Fe^{+3}$), calcium ($Ca^{+2}$), copper ($Cu^{+2}$), etc. and anions such as chloride ($Cl^-$), carbonate ($CO_3^{2-}$), nitrate ($NO_3^-$), and sulfate ($SO_4^{2-}$). Because of contaminants commonly found in water stored in tanks on vehicles, means and methods are needed to generate and supply a PEM inert gas generator with pure water to avoid PEM stack performance degradation. Use of pure (de-ionized or distilled) water avoids performance degradation due to mineral deposits on electrode surfaces of the PEM stack. This can result in longer lasting stack life and a longer maintenance intervals for such systems.

In accordance with some embodiments of the present disclosure, a supply of purified (pure or DI) water is provided on a vehicle to feed a PEM stack that generates inert gas. In some such embodiments, the water supply is a tank of distilled or deionized water that is replenished according to a regular maintenance schedule. In other such embodiments, water from a domestic water tank on the vehicle is purified (e.g., through distillation and/or demineralization) to generate the DI water.

As noted above, pure water may be required to be replenished or resupplied into a PEM system because the water used by the system may be consumed at the anode. An equivalent amount of water is generated at the cathode, and some of this water exits the PEM stack as humidity in the generated inert gas. Disclosed herein and in other applications of the Applicant, reclamation of water from inert gas is possible. However, in some systems, not all water can be recaptured, and thus a need for replenishment or resupply of pure water is needed. Further, water can also exit the systems in other ways. For example, water can exit the system through a leak (e.g., through a failed stack seal or a loose hose clamp). Further, for example, a failed electrolyte membrane may allow the transfer of water from the anode side to the cathode side through a leak. Although in such situation the water may not immediately exit the system, it may overwhelm the capacity of an included recapture system. Another possible point of loss of pure water may be in a degassing process. The oxygen generated due to electrolysis at the anode has to be separated out; during the separation process, it may be possible to lose some water depending on the degassing technology used. Accordingly, a replenishment of the lost pure water may be required from time to time (or continuously) to ensure that sufficient pure water is available for operation of the PEM stack.

Figure 5:
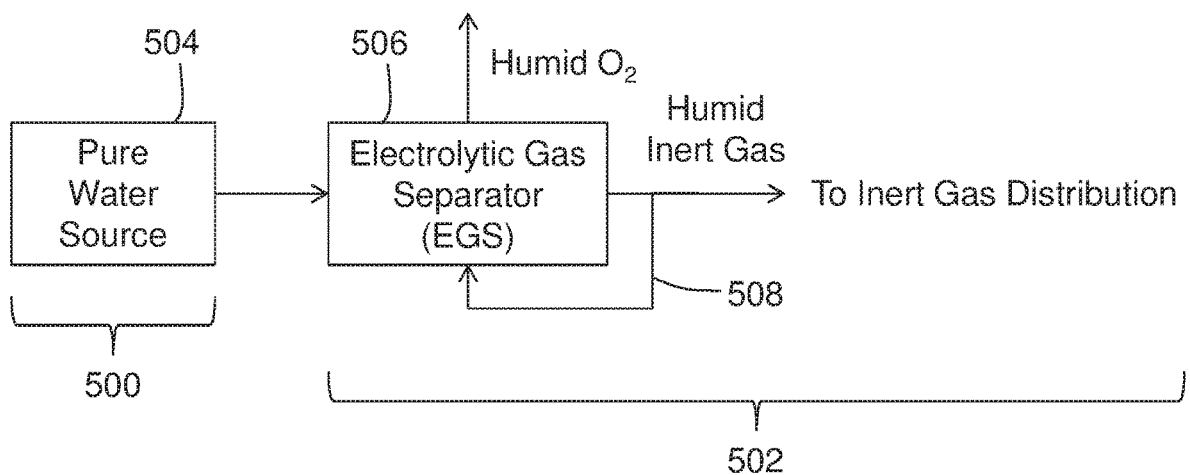
FIG. 5 is a schematic illustration of a PEM inerting system having a pure water source in accordance with an embodiment of the present disclosure.

For example, turning to FIG. 5 a pure water replenishment system 500 for a Proton Exchange Membrane (PEM) inerting system 502 is schematically shown. The pure water replenishment system 500 includes a generator, supply, other water supply 504 for providing pure or DI water to the inerting system 502. In some embodiments, the water supply 504 may be a holding tank or container arranged on a vehicle with the contents of the tank or container being DI water. A valve or other mechanism can control a supply or rate of flow from the water supply 504 to an electrolytic gas separator 506 of the inerting system 502. In other embodiments, the supply from the water supply 504 to the to an electrolytic gas separator 506 may be passive, based on a fluid level or pressure within the system (e.g., passive water tanks arranged to maintaining a specific amount of water within the electrolytic gas separator 506 for performing the inert gas generation operation.

If a tank or other container is employed on an aircraft in the form of the water supply 504, such tank or other container may require replenishment or refilling when an aircraft is grounded. That is, the container/tank configuration of the water supply 504 may be configured as a refillable container that allows for maintenance personnel to refill such container/tank based on a schedule or as-needed basis. Other configurations in accordance with the present disclosure may be implemented with a process of refilling of the water supply 504 from a local or domestic (i.e., onboard) water supply (e.g., the general water supply on an aircraft). In some such embodiments, the domestic water will require treatment or processing to ensure that the water quality is sufficient for the purposes of operation of the Proton Exchange Membrane (PEM) inerting system 502, as described above. Treatment can include, without limitation, distillation and/or water filtration, as described herein.

As shown, in addition to the pure water replenishment system 500 providing a replenishment of DI water to the inerting system 502, a recapture loop 508 may be incorporated into the inerting system 502. The recapture loop 508 can include one or more components to recapture and recycle humidity (i.e., water) from an inert gas product stream. Also not shown in FIG. 5 may be other components to provide and/or control the supply of DI water from the water supply 504 to the electrolytic gas separator 506, which may include, without limitation, a pump, a tank fill port, a drain, etc. The pure water replenishment system 500 can include one or more of the following: a filter, an adsorbent, a membrane separator, a catalytic combustor, electrostatic precipitator, a scrubber, a condensing separator, and a gas-liquid separator. Additional and/or alternative components may be employed without departing from the scope of the present disclosure.

Figure 6:
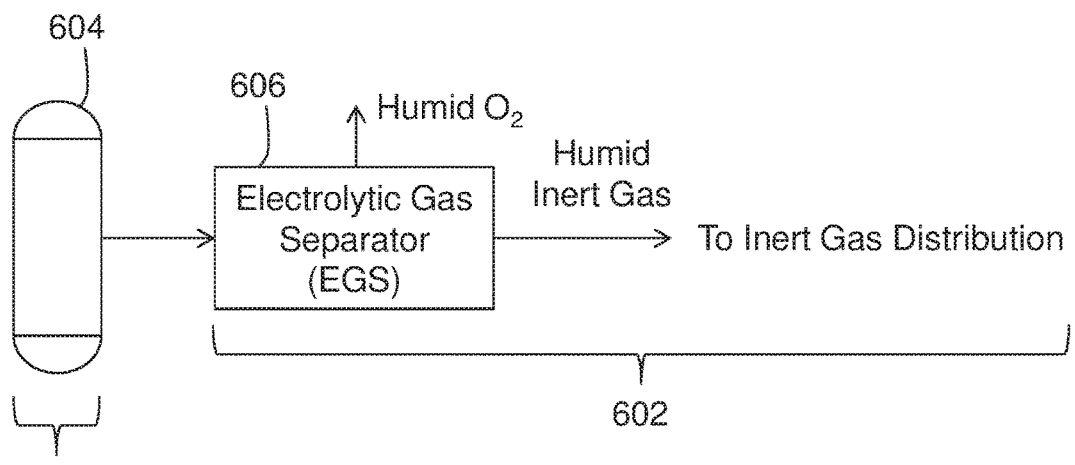
FIG. 6 is a schematic illustration of a PEM inerting system having a pure water supply tank in accordance with an embodiment of the present disclosure.

FIG. 6 illustrates a tank or container configuration in accordance with an embodiment of the present disclosure. In this embodiment, a water replenishment system 600 for a Proton Exchange Membrane (PEM) inerting system 602 is schematically shown. The water replenishment system 600 of this embodiment is in the form of a supply or reservoir tank 604 for providing pure or DI water to the inerting system 602. The supply tank 604 can be filled with pure water. The supply tank 604 is arranged in fluid connection with the inerting system 602, and specifically to a portion of an electrolytic gas separator 606 of the inerting system 602. A valve or other mechanism can control a supply or rate of flow from the supply tank 604 to the electrolytic gas separator 606.

In this embodiment, additional water treatment systems or elements are not required. That is the supply tank 604 can be directly filled with distilled or DI water that is not mixed with other onboard water on a vehicle. As such, the supply tank 604 can provide for a pure source of water from the supply tank 604 to the electrolytic gas separator 606 of the inerting system 602. In embodiment in which the vehicle is an aircraft, and as noted above, the supply tank 604 may be refilled or replenished when the aircraft is on the ground, based on a maintenance schedule, as-needed, or for other reason/schedule. In some such embodiments, the aircraft will typically include a separate domestic water tank to supply the aircraft with water needs (e.g., potable water, waste water, etc.). Although not shown, the Proton Exchange Membrane (PEM) inerting system 602 can include a recycle or recapture system, as described above.

Figure 7:
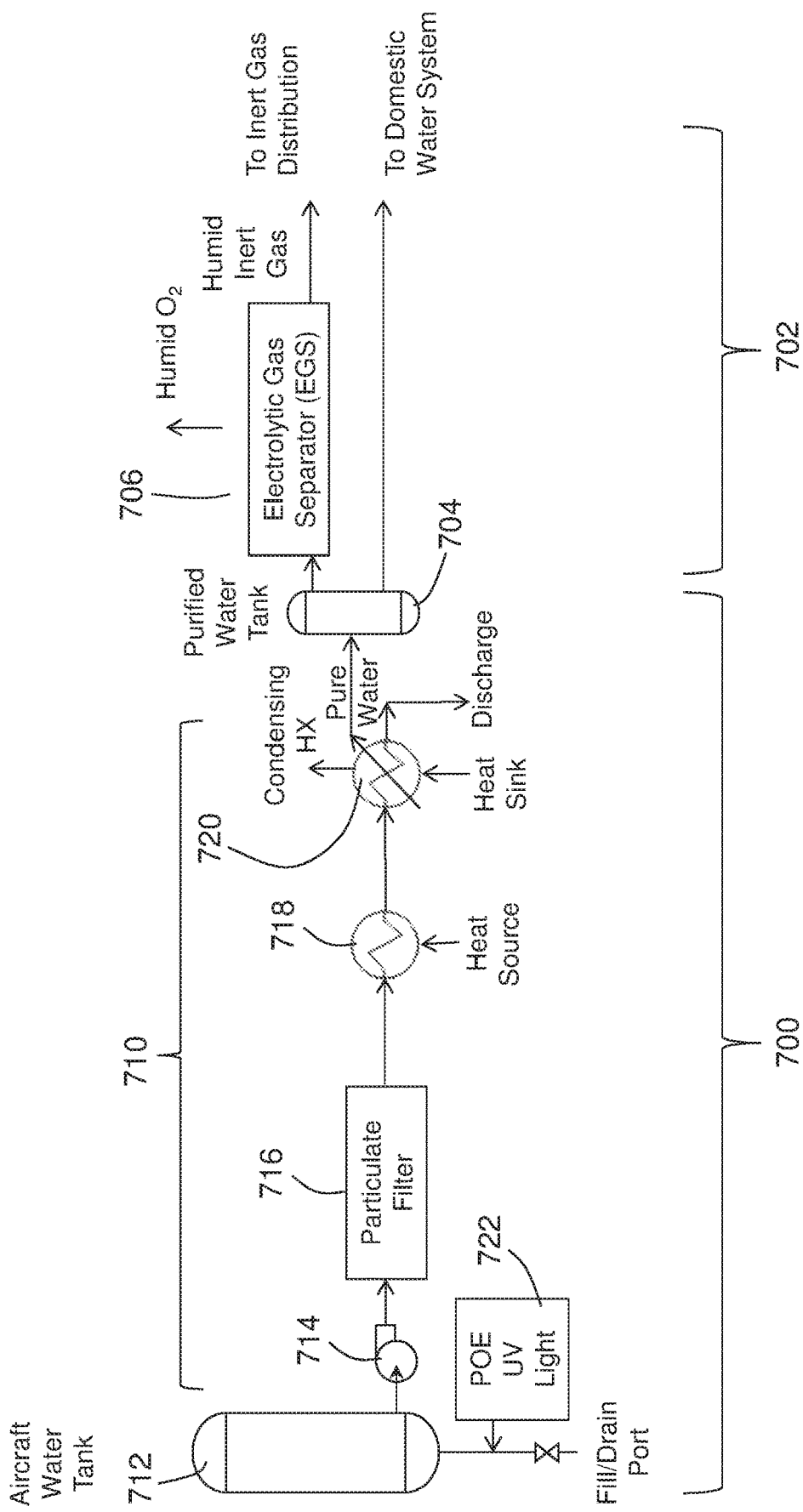
FIG. 7 is a schematic illustration of a PEM inerting system having a pure water source generation system in accordance with an embodiment of the present disclosure.

FIG. 7 illustrates a pure water generation configuration in accordance with an embodiment of the present disclosure. In this embodiment, a water replenishment system 700 for a Proton Exchange Membrane (PEM) inerting system 702 is schematically shown. The water replenishment system 700 of this embodiment is in the form of a water purification system 710 configured to supply DI water to the inerting system 702. The water purification system 710 is arranged in fluid connection with the inerting system 702, and specifically to a portion of an electrolytic gas separator 706 of the inerting system 702.

The water purification system 710, of this embodiment, is configured for distillation of an unpure water. For example, as shown, the water purification system 710 is configured to receive domestic water from a vehicle water tank 712. The water purification system 710 will then process and/or treat the domestic water to generate DI water to be provided either directly into the inerting system 702 or into a supply tank 704 that can be configured as a holding tank or reservoir of the water replenishment system 700. In this illustrative embodiment, the water purification system 710 includes a pump 714, a particulate filter 716, a heater 718 (e.g., an evaporator), and a condenser 720. As such, the water replenishment system 700 can provide DI water to the inerting system 702 for operation thereof. It will be appreciated that one or more of the components of the water purification system 710 may be optional and/or that other components may be included within the system to provide DI water to the inerting system 702.

In some embodiments, as illustratively shown in FIG. 7, a portion of the treated water may, optionally, be resupplied into the domestic water system after passing through the water purification system 710. Further, as shown, the vehicle water tank 712 may be part of a domestic water supply onboard the vehicle. Thus, the vehicle water tank 712 may provide potable water for use on the vehicle. In some embodiments, the vehicle water tank 712 includes fill/drain port(s) and may include one or more treatment components 722 for treating or pre-treating water filled from, for example, a ground source. Such treatment components 722 can include filters or other components to ensure that the water within the vehicle water tank 712 is acceptable for use onboard the vehicle.

In some embodiments, the water purification system 710 can be configured to generate both DI water and potable water. Advantageously, e.g., for aircraft configurations, such system can address potential low water quality that may be filled onto the aircraft at certain locations in travel (e.g., developing countries, etc.). However, distilled or DI water is not potable, and thus there may be a need to add salts to the generated DI water for use as domestic water. Such reintroduction of salts (or other properties) may be employed using components, systems, or mechanisms as known in the art. Further, for domestic water generation (i.e., for use on the aircraft other than for inerting purposes), the heater 718 and the condenser 720 can be bypassed and a domestic water treatment system can be retained (as known in the art). Although not shown, the Proton Exchange Membrane (PEM) inerting system 702 can include a recycle or recapture system, as described above.

Figure 8:
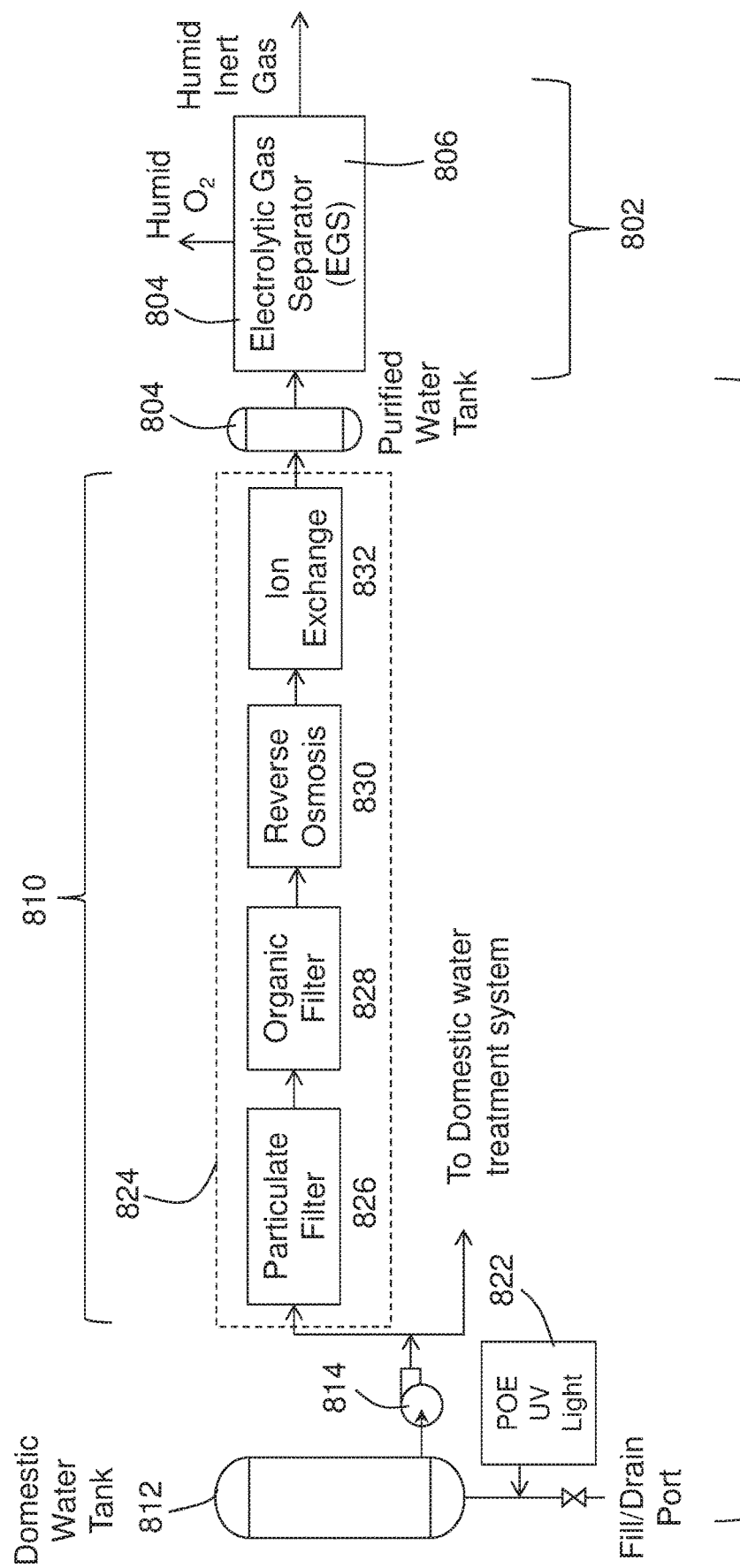
FIG. 8 is a schematic illustration of a PEM inerting system having a pure water source generation system in accordance with an embodiment of the present disclosure.

FIG. 8 illustrates a pure water generation configuration in accordance with an embodiment of the present disclosure. In this embodiment, a water replenishment system 800 for a Proton Exchange Membrane (PEM) inerting system 802 is schematically shown. The water replenishment system 800 of this embodiment is in the form of a water purification system 810 configured to supply DI water to the inerting system 802. The water purification system 810 is arranged in fluid connection with the inerting system 802, and specifically to a portion of an electrolytic gas separator 806 of the inerting system 802.

The water purification system 810, of this embodiment, is configured as a multi-stage water treatment system 824. For example, as shown, the water purification system 810 is configured to receive domestic water from a vehicle water tank 812. The water purification system 810 will then process and/or treat the domestic water to generate DI water to be provided either directly into the inerting system 802 or into a supply tank 804 that can be configured as a holding tank or reservoir of the water replenishment system 800. In this illustrative embodiment, a pump 814 is configured to extract water from the vehicle water tank 812 and supply such water to the water purification system 810 and/or a domestic water treatment system (e.g., for general water use on a vehicle). The water purification system 810 of this illustrative embodiment includes, a particulate filter 826, an organic filter 828, a reverse osmosis module 830, and an ion exchange module 832. Those of skill in the art will appreciate that the water purification system 810 can include any number of water treatment stages, in any order, and is not limited to the present illustrative configuration. Common water treatment stages, for example, include but are not limited to, coarse filters, organic filters (e.g., activated carbon beds), reverse osmosis modules, and ion exchange beds (e.g., deionization/demineralization). Electro-deionization could also be used; normally it is a polishing step for use with a reverse osmosis system.

As such, the water replenishment system 800 can provide DI water to the inerting system 802 for operation thereof. It will be appreciated that one or more of the components of the water purification system 810 may be optional and/or that other components may be included within the system to provide DI water to the inerting system 802. For example, the organic filter 828 and/or the reverse osmosis module 830 may be omitted in some configurations. Further, for example, the ion exchange module 832 may be a demineralizer and, in some embodiments, the ion exchanger module 832 may be part of a recycle/recapture system (e.g., recapture loop 508 shown in FIG. 5).

In this embodiment, the Proton Exchange Membrane (PEM) inerting system 802 and the domestic water treatment system (and domestic water supply on the vehicle) have a shared water tank (i.e., vehicle water tank 812). In this configuration, the vehicle water tank 812 has a single point of entry that includes treatment components 822, similar to that described above. The treatment components 822 can include, for example, a disinfectant module (e.g., ultraviolet (UV) light source). It will be appreciated that components of the domestic water treatment system are not shown, and well known in the art. Further, various other fluid control and distribution components are not shown for clarity, such as, valves, vents, pipes, additional filters, etc.

In some alternative arrangements of the configuration shown in FIG. 8, the water purification system 810 and the domestic water treatment system may be integrated and/or share components. In some such embodiments, the domestic water may be extracted from the water purification system 810 prior to the ion exchange module 832 (i.e., to ensure proper domestic water quality). As such, in this configuration/embodiment, a single water purification/treatment system is configured to produce water for different applications at different purity levels.

As noted above, in some embodiments, a recycle/recapture system (e.g., recapture loop 508 shown in FIG. 5) can be employed to reduce water waste and maximize use of DI water within a water replenishment system of the present disclosure. In some embodiments, a water purifier can be configured to treat the process water circulating through the stack of the Proton Exchange Membrane (PEM) inerting system. The water purifier is configured to remove, for example, minerals, salts, and organic contaminants. In accordance with some such embodiments, a recapture purification system can reduce and/or eliminate the need to replenish the system form an external source (e.g., as shown and described above). In other embodiments, such recapture purification systems may be used in combination with the supply systems described above. If a supply system is eliminated, advantageously, transport of additional water (for process DI water) for a flight may be eliminated (e.g., no additional on-board water tank may be required).

Figure 9:
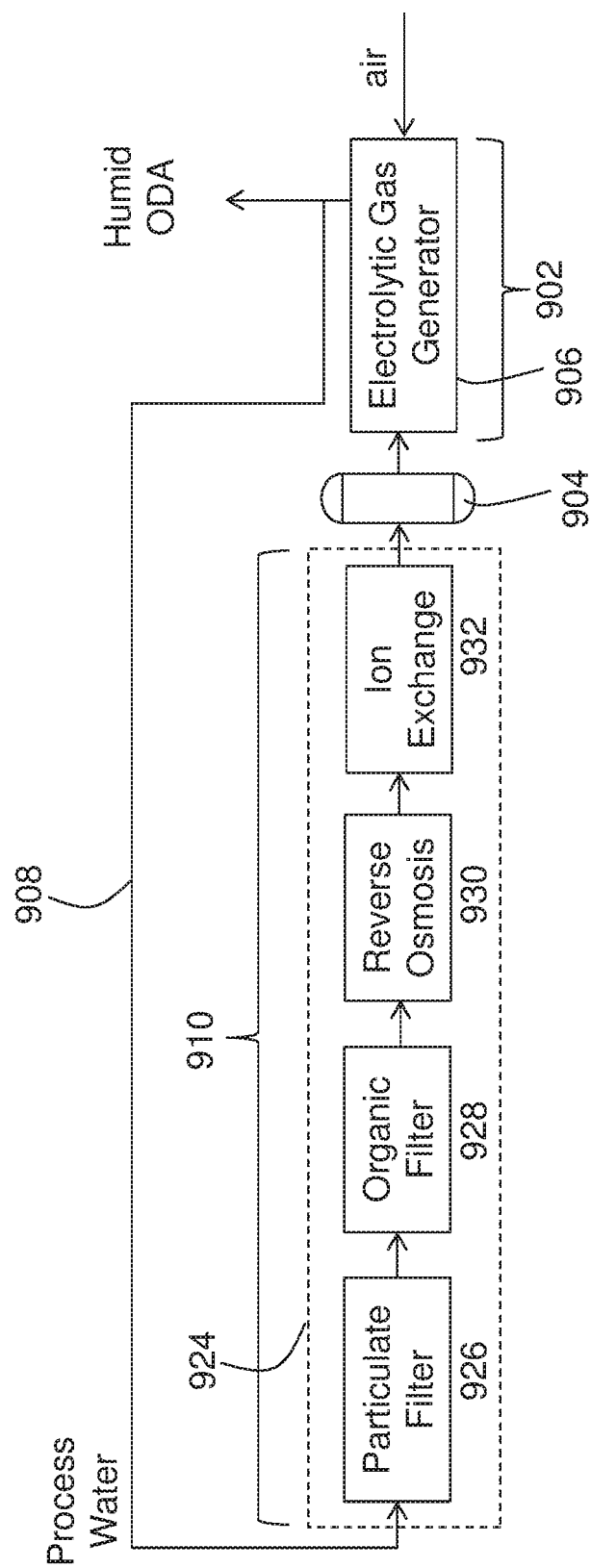
FIG. 9 is a schematic illustration of a PEM inerting system having a pure water recycle/recapture system in accordance with an embodiment of the present disclosure.

FIG. 9 illustrates a pure water recycling configuration in accordance with an embodiment of the present disclosure. In this embodiment, a recapture loop 908 for a Proton Exchange Membrane (PEM) inerting system 902 is schematically shown. The recapture loop 908 of this embodiment includes a water purification system 910 configured to supply recycled DI water to the inerting system 902. The recapture loop 908 is arranged in fluid connection with the inerting system 902, and specifically to a portion of an electrolytic gas separator 906 of the inerting system 902.

In FIG. 9, a multi-stage water treatment system 924 is provided as, at least part of, the water purification system 910 similar to that used in the configured shown in FIG. 8 is employed. It is noted that the primary difference here is that the water supplied to the water purification system 910 is recycled or recaptured moisture/water that is a product of the inert gas generation at the electrolytic gas separator 906. The water purification system 910 can supply DI water either directly into the inerting system 902 or into a supply tank 904 that can be configured as a holding tank or reservoir. The water purification system 910 can include any number of water treatment stages, in any order, and is not limited to the present illustrative configuration. Common water treatment stages, for example, include but are not limited to, coarse filters, organic filters (e.g., activated carbon beds), reverse osmosis modules, and ion exchange beds (e.g., deionization/demineralization). Electro-deionization could also be used; normally it is a polishing step for use with a reverse osmosis system. In this illustrative configuration, the water purification system 910 includes a particulate filter 926, an organic filter 928, a reverse osmosis module 930, and an ion exchange module 932.

In other embodiments, distillation may be employed to generate DI water for use with a PEM system. For example, the use of heat (e.g., waste heat) to boil water (e.g., recycled/recaptured water) to leave purities behind and enable condensing pure water. Heat sources for distillation in such configurations can include, without limitation, bleed air, electric heaters, and waste heat from a heat exchanger onboard a vehicle. Heat sinks can be used to condense the steam generated by boiling the water. Such heat sinks can include, without limitation, ram (outside) air, fan air, conditioned air, cabin outflow air, and/or a cooling fluid such as from a cooling loop for electronics and equipment cooling onboard an vehicle.

Figure 10:
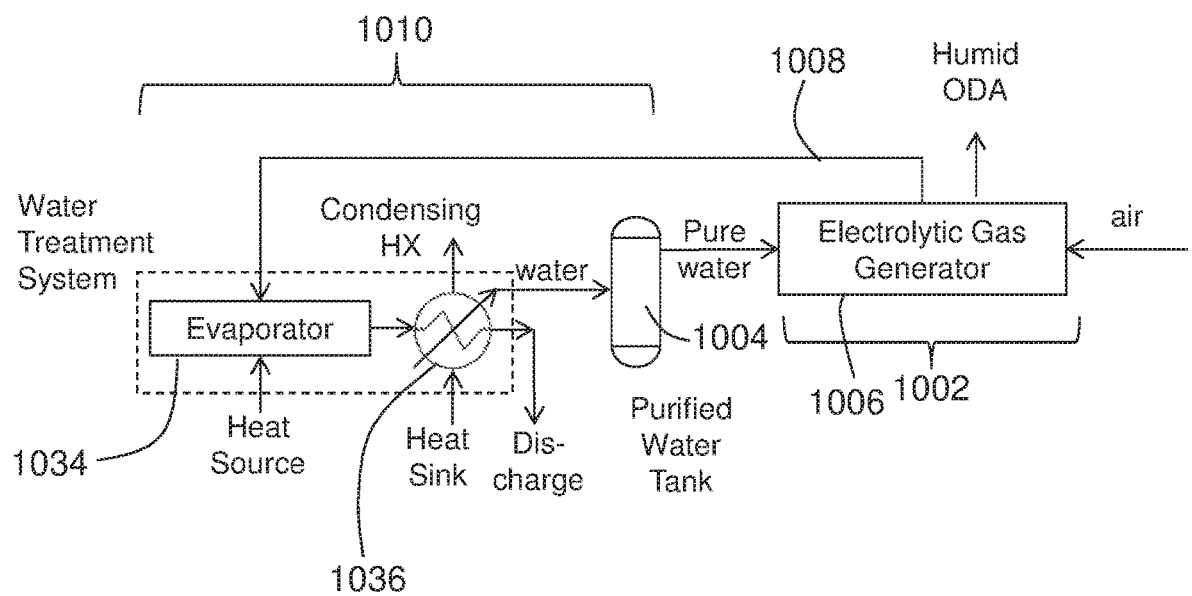
FIG. 10 is a schematic illustration of a PEM inerting system having a pure water recycle/recapture system in accordance with an embodiment of the present disclosure.

For example, FIG. 10 illustrates a pure water recycling configuration in accordance with an embodiment of the present disclosure. In this embodiment, a recapture loop 1008 for a Proton Exchange Membrane (PEM) inerting system 1002 is schematically shown. The recapture loop 1008 of this embodiment includes a water purification system 1010 configured to supply recycled DI water to the inerting system 1002. The recapture loop 1008 is arranged in fluid connection with the inerting system 1002, and specifically to a portion of an electrolytic gas separator 1006 of the inerting system 1002. The water purification system 1010 can supply DI water either directly into the inerting system 1002 or into a supply tank 1004 that can be configured as a holding tank or reservoir.

In FIG. 10, the recapture loop 1008 supplies excess moisture/water from the output of the electrolytic gas separator 1006 into an evaporator 1034 (i.e., process water or recycled/recaptured water). The evaporator will boil the process water to separate out impurities. The steam may then be passed through a condenser 1036 to ensure that the recaptured water is in liquid form when provided back to the inerting system 1002 or into the supply tank 1004.

It is noted that any of the above described embodiments, or other embodiments described here, can be applied to a dual-mode PEM inert gas generation device, as described above. As noted above, the modes are (1) electrochemical gas separation by electrolyzing water at the anode and (2) fuel cell mode in which the PEM stack consumes hydrogen or other fuel at the anode. It is noted that the fuel cell mode does not consume water, so, in some embodiments, the pure water generation and/or supply can be disabled or deactivated during the fuel cell mode. It should be noted, however, that water may be used for additional purposes and uses, including, for example and without limitation, electrolyte humidification, as known to those skilled in the art. In such configurations, the water may become contaminated in the stack with impurities from the cathode gas supply which can include, without limitation, salts, organic compounds, etc., which are preferably removed from the water.

Furthermore, in various embodiments, an automatic water replenishment system can be implemented. Such automatic water replenishment system may be employed with any of the above described embodiments (i.e., DI water generation, DI water recycle/capture, and/or combinations thereof). The automatic water replenishment system can be configured to detect a low water level within a PEM electrolytic inert gas generation system and control replenishment of the water for use in the PEM electrolytic inert gas generation system. In some such embodiments, sensors may be configured to measure water levels within a supply tank and/or reservoir and/or water quality or flow rate through one or more conduits of the system. Such detection mechanisms can include, without limitation, float sensors, capacitance sensors, optical sensors, flow rate sensors, fluid pressure sensors, etc.

Figure 11:
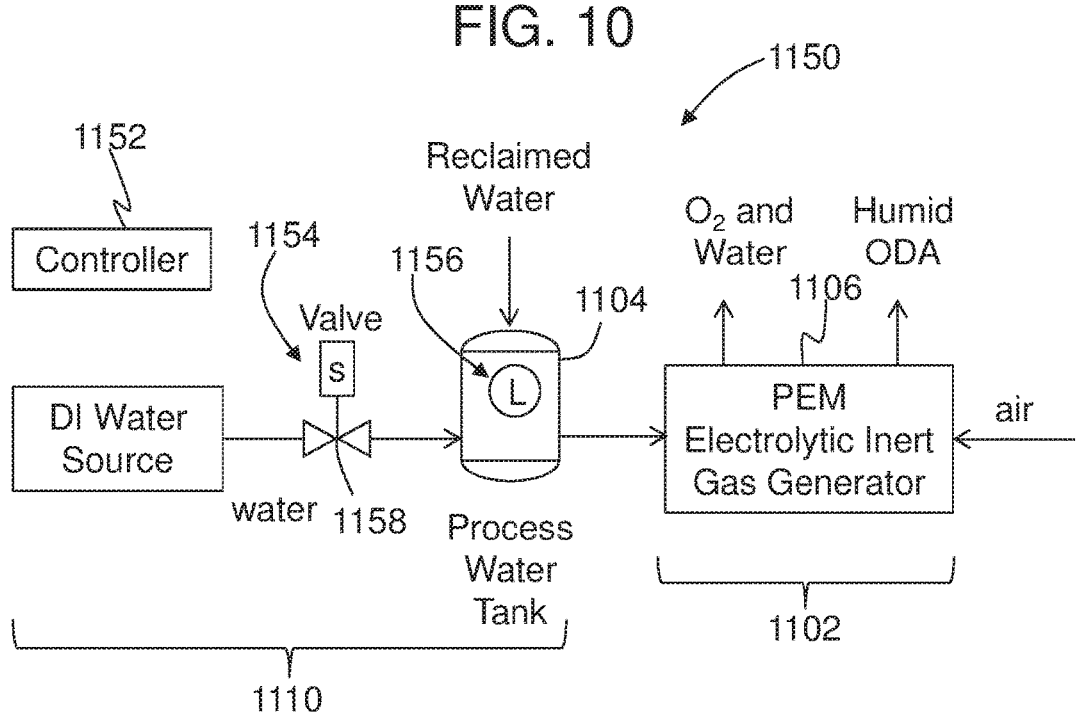
FIG. 11 is a schematic illustration of a PEM inerting system having a control system in accordance with an embodiment of the present disclosure.

For example, turning to FIG. 11 a control system 1150 for operating a pure water generation and/or replenishment system in accordance with an embodiment of the present disclosure is shown. The control system 1150 may be configured with and/or part of a system as shown and described above. For example, as shown, the control system 1150 includes a water purification system 1110 configured to provide pure (distilled or DI water) to a Proton Exchange Membrane (PEM) inerting system 1102 having an electrolytic gas separator 1106. The control system 1150, as illustrated, includes a controller 1152 in communication with and/or in operable communication with one or more sensors. The sensors, as shown, include a valve sensor 1154 and a fluid level sensor 1156. The valve sensor 1154 is arranged to detect a fluid flow, fluid pressure, and/or valve state of a valve 1158 of the water purification system 1110. The fluid level sensor 1156 is arranged within a supply tank 1104 and is configured to monitor a level and/or amount of pure (distilled or DI water) that is available for use with the Proton Exchange Membrane (PEM) inerting system 1102. Although shown with only two specific sensors, those of skill in the art will appreciate that other sensors, detector, or monitoring elements may be included within a control system without departing from the scope of the present disclosure.

In some embodiments, the controller 1152 can be omitted, with the sensors and/or control elements (e.g., valves) of the system being passive with respect to operation based on fluid pressure, flow rates, fluid levels, fluid volumes, etc. (e.g., use of a float valve, fluid level optical sensor, etc.). In some embodiments that include the controller 1152 or in passive systems, a specific or predetermined minimum level of pure water may be maintained for operation of the Proton Exchange Membrane (PEM) inerting system 1102. For example, in one non-limiting embodiment, the controller or a passive sensor may be configured to monitor for and cause replenishment to maintain at least one day of flight for a given aircraft that includes such a system. Such configuration may be advantageous to minimize the amount of water used (e.g., for weight considerations) but maximize efficiencies and ensure that a full day of flight can be achieved without grounding a flight for repairs (e.g., to account for system failures, etc.).

Further, in some embodiments, a water quality sensor may be included and in communication with the controller 1152. In some such embodiments, the purity of the water may be monitored to ensure that the water quality is maintained within an appropriate or desired range (e.g., as described above). For example, the exposure of water to ambient air in the cathode can lead to the dissolution of carbon dioxide, $CO_2$ (aq), in the water. Such dissolution of $CO_2$ into the water can degrade the water quality by forming carbonic acid, $H_2CO_3$ (aq). In water, carbonic acid may dissociate by losing protons to form bicarbonate, $HCO_3^-$, and carbonate, $CO_3^{2-}$ ions. The presence of ions in process water represents an alternative pathway for charge transfer in the electrochemical system. As a result, more power may be required for the desired electrochemical reactions to proceed in the electrolytic mode and in the fuel cell mode less power may be generated. As a result, process water for PEM systems should be regularly replenished, treated, or otherwise conditioned to remove impurities.

For example, in some such embodiments, if the water quality drops below or rises above a given threshold (or range), then a pure water replenishment system may be operated to inject additional pure water into the system to maintain a desired quality of water. Further, in some such embodiments, and/or in combination therewith, if a water quality is detected outside of a desired range, water within the PEM system may be passed through a pure water replenishment system or a portion thereof, to treat and condition the water to a desired or predetermined water quality. The above described water quality system, in some embodiments, may be implemented in combination with a water level or pressure system that is passive (e.g., float valve) and/or active (e.g., electronically controlled system), without departing from the scope of the present disclosure.

Advantageously, embodiments of the present disclosure provide for a source, supply, and/or control over a level of pure water (i.e., distilled or DI water) for use with a Proton Exchange Membrane (PEM) inerting system on a vehicle. In some embodiments, a replenishment process can be provided that treats external water and converts such external water (e.g., onboard domestic water) into pure water for use with the PEM inerting system. In some embodiments, a recycling and/or recapture loop can be provided to ensure a pure water quality level of recycled/recaptured water of the PEM inerting system. Further, in some embodiments, an active or passive control mechanism can be included to ensure that a predetermined level or amount of pure water is maintained for use with the PEM inerting system. Moreover, various combinations of the above described systems can be employed without departing from the scope of the present disclosure. Furthermore, advantageously, various embodiments described herein can reduce, prevent, or eliminate PEM stack performance degradation that may occur through the use of unpure water. That is, embodiments described herein are directed to ensuring a proper water quality and quantity are available for use with a PEM inerting system.

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for generating inerting gas on an aircraft a vehicle, the system comprising:
   a proton exchange membrane (PEM) inerting system configured to generate inert gas to be supplied to at least one of an aircraft fuel tank ullage space, an aircraft cargo hold, an aircraft fire suppression system, and an aircraft equipment bay;
   a pure water supply tank fluidly connected to the PEM inerting system and configured to provide pure water to be used in the generation of the inert gas;
   a pure water replenishment system arranged onboard the aircraft and configured to provide replenishment pure water to the pure water supply tank, wherein the pure water replenishment system is in fluid communication with the pure water supply tank to replenish pure water lost during operation of the PEM inerting system, wherein the pure water replenishment system includes a pure water replenishment source of pure water arranged onboard the aircraft;
   a valve arranged along a supply line between the pure water replenishment source and the pure water supply tank and configured to control a supply of the replenishment pure water to the pure water supply tank;
   a valve sensor arranged along the supply line and configured to detect at least one of a fluid flow, a fluid pressure, and a valve state of the valve;
   a fluid level sensor arranged in the pure water supply tank and configured to monitor a level and/or amount of pure water that is available for use with the PEM inerting system; and
   a control system configured to control operation of the pure water replenishment system to automatically replenish pure water to the pure water supply tank from the pure water replenishment source,
   wherein the control system is operably connected to the valve sensor and the fluid level sensor and configured to monitor a water level within the pure water supply tank, and
   wherein the control system is configured to (i) detect a low water level within the pure water supply tank and (ii) maintain a predetermined minimum level of pure water within the pure water supply tank in response to a detected low water level by controlling the valve to open and supply pure water from the pure water replenishment source to maintain the level of pure water within the PEM inerting system at or above a level of pure water to maintain a predetermined water quality within the PEM inerting system.

2. The system of claim 1, wherein the control system comprises a controller configured to electronically control operation of the pure water replenishment system.

3. The system of claim 1, wherein the control system comprises a mechanical actuator configured to passively control operation of the pure water replenishment system.

4. The system of claim 3, wherein the mechanical actuator is a float valve.

5. The system of claim 1, wherein the pure water replenishment system comprises a water purification system to treat water and generate pure water to be supplied to at least one of the PEM inerting system and the pure water supply tank.

6. The system of claim 5, wherein the water purification system receives water from an onboard domestic water tank on the aircraft.

7. The system of claim 5, wherein the water purification system includes at least one of a particulate filter, a heat source, and a condenser.

8. The system of claim 5, further comprising at least one treatment component configured to pre-treat the water prior to entering the water purification system.

9. The system of claim 8, wherein the at least one treatment component comprises an ultraviolet light source.

10. The system of claim 5, wherein the water purification system includes at least one of a particulate filter and an ion exchange module.

11. The system of claim 10, wherein the water purification system includes at least one of an organic filter and a reverse osmosis module.

12. The system of claim 5, wherein a portion of water treated within the water purification system is supplied to an onboard domestic water supply of the aircraft.

13. The system of claim 5, further comprising a pump configured to supply water to the water purification system.

14. The system of claim 1, further comprising a recapture loop configured to direct at least one of moisture and water from an output of the PEM inerting system back into the PEM inerting system.

15. The system of claim 14, wherein the recapture loop includes a water treatment system.

16. The system of claim 1, further comprising at least one sensor configured to monitor a fluid flow rate of the pure water replenishment system.

17. A method for generating inerting gas on an aircraft, the method comprising:
  generating an inerting gas using a proton exchange membrane (PEM) inerting system employing an electrolysis reaction using pure water;
  supplying the inerting gas to at least one of an aircraft fuel tank ullage space, an aircraft cargo hold, an aircraft fire suppression system, and an aircraft equipment bay;
  providing pure water to the PEM inerting system from a pure water supply tank onboard the aircraft at or above a level of pure water to maintain a predetermined water quality within the PEM inerting system;
  monitoring a water quality in the PEM inerting system;
  in response to detecting a water quality below a predetermined quality, supplying the pure water supply tank with replenishment water from a pure water replenishment system, wherein the pure water replenishment system is in fluid communication with the pure water supply tank to replenish water lost during operation of the PEM inerting system, the pure water replenishment system comprises a pure water replenishment source, a valve arranged along a supply line between the pure water replenishment source and the pure water supply tank and configured to control a supply of pure water to the pure water supply tank from the pure water replenishment source, a valve sensor arranged along the supply line and configured to detect at least one of a fluid flow, a fluid pressure, and a valve state of the valve, and a fluid level sensor arranged in the pure water supply tank and configured to monitor a level and/or amount of pure water that is available for use with the PEM inerting system;
  monitoring a water level within the pure water supply tank using the fluid level sensor arranged within the pure water supply tank;
  detecting a low water level within the pure water supply tank; and
  controlling operation of the pure water replenishment system to automatically replenish pure water to the pure water supply tank from the pure water replenishment source to maintain a predetermined minimum level of pure water within the PEM inerting system to maintain the predetermined water quality.

18. The method of claim 17, further comprising treating water to generate treated water using a water purification system and supplying said treated water to at least one of the PEM inerting system and the pure water supply tank.

19. The method of claim 17, further comprising recapturing at least one of moisture and water from an output of the PEM inerting system and directing said recaptured moisture and/or water through a recapture loop to direct back into the PEM inerting system.

* * * * *